United States Patent [19]

Wilson et al.

[11] 4,193,452

[45] Mar. 18, 1980

[54] WATERFLOODING EMPLOYING THICKENED AQUEOUS LIQUIDS

[75] Inventors: Peggy M. Wilson; Julie Pao, both of Dallas, Tex.

[73] Assignee: Mobil Oil Corporation, New York, N.Y.

[21] Appl. No.: 931,590

[22] Filed: Aug. 7, 1978

[51] Int. Cl.$^2$ .............................................. E21B 43/22
[52] U.S. Cl. .................................. 166/274; 166/275; 252/8.55 D
[58] Field of Search .................. 252/8.55 D; 166/274, 166/275

[56] References Cited

U.S. PATENT DOCUMENTS

| | | | |
|---|---|---|---|
| 3,280,179 | 10/1966 | Ernst | 260/501.12 |
| 3,366,174 | 1/1968 | Ferrell et al. | 166/273 |
| 3,939,911 | 2/1976 | Maddox et al. | 166/274 |
| 4,042,030 | 8/1977 | Savins et al. | 252/8.55 X |
| 4,076,743 | 2/1978 | Koch et al. | 260/501.13 |

FOREIGN PATENT DOCUMENTS 2744384  6/1978  Fed. Rep. of Germany ........... 166/275

*Primary Examiner*—Herbert B. Guynn
*Attorney, Agent, or Firm*—C. A. Huggett; William D. Jackson

[57] ABSTRACT

Waterflood process for the recovery of oil from a subterranean oil reservoir in which at least a portion of the injected water is thickened by the addition of a surface-active amphoteric quaternary ammonium sulfonate and an aliphatic alcohol containing from 5 to 8 carbon atoms. The alcohol is employed in a concentration to provide a ratio of the volume amount of alcohol in the solution to the weight amount of the amphoteric sulfonate within the range of 0.1–0.6 to produce a pronounced thickening effect. The alcohol-amphoteric sulfonate systems are useful viscosifiers in highly saline systems.

6 Claims, 5 Drawing Figures

WATERFLOODING EMPLOYING THICKENED AQUEOUS LIQUIDS

BACKGROUND OF THE INVENTION

This invention relates to the recovery of oil from subterranean oil reservoirs and more particularly to improved waterflooding operations involving the injection of a viscous aqueous liquid formulated through the use of a mixture of a $C_5$–$C_8$ aliphatic alcohol and an amphoteric surfactant.

In the recovery of oil from oil-bearing reservoirs, it usually is possible to recover only minor portions of the original oil in place by the so-called primary recovery methods which utilize only the natural forces present in the reservoir. Thus, a variety of supplemental recovery techniques has been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

Various chemical additives may be employed in the injected water. For example, the injected water may contain surface-active agents which effect a reduction in the oil-water interfacial tension, thus enhancing the microscopic displacement of the oil by the water. Another widely used technique involves the addition of thickening agents which increase the viscosity of the injected water, normally to a value at least equal to that of the reservoir oil, in order to arrive at a favorable mobility ratio between the oil and water and increase the macroscopic displacement efficiency of the waterflood. Typically such viscosifiers or mobility control agents have taken the form of biopolymers such as the bacterial biopolymer available from the Kelco Company under the trade name "Kelzan" or synthetic polymers such as the partially hydrolyzed polyacrylamides available from the Dow Chemical Company under the trade name "Pusher" chemicals.

An alternative to the use of polymeric thickening agents involves the injection of a thickened aqueous surfactant solution as disclosed in U.S. Pat. No. 4,042,030 to Savins et al. In this process, at least a portion of the injected water is thickened through the use of an alkylaryl sulfonate in combination with a $C_4$–$C_6$ aliphatic alcohol having a hydrocarbon chain length of at least 3 carbon atoms. The action of the surfactant-alcohol system is increasing the viscosity of the water is dependent upon the relative concentrations of the sulfonate surfactant and the alcohol and is effective at relatively low salinities. The alcohol is present in a concentration such that the ratio of the surfactant to the sum of the amount of the surfactant and alcohol is within the range of 0.3–0.8. The salinity of the alcohol-surfactant solution ranges up to 3.0 weight percent. The thickened aqueous solution of surfactant and alcohol may be preceded by a relatively low viscosity surfactant slug. Another surfactant waterflooding process involving the injection of a thickened aqueous surfactant solution is disclosed in U.S. patent application Ser. No. 819,805, filed July 28, 1977, by Savins et al. This application discloses the injection of a viscous surfactant slug having certain relative concentrations of a petroleum sulfonate having a relatively broad molecular weight distribution and a synthetic sulfonate having a relatively narrow molecular weight distribution which interact synergistically to thicken the aqueous liquid for mobility control purposes. The salinity of the thickened aqueous solution may range up to 4.0 weight percent. The thickened aqueous solution may optionally contain a water-soluble $C_3$–$C_6$ aliphatic alcohol.

Thus far the surfactants used predominantly in decreasing the oil-water interfacial tension have been petroleum sulfonates and synthetic alkyl or alkylaryl sulfonates. While these surfactants are extremely effective in reducing the interfacial tension to desired low values within the millidyne per centimeter range, their usefulness is limited since they lack stability in the so-called "high brine" environments. These surfactants tend to precipitate in the presence of monovalent salts such as sodium chlorides at concentrations in excess of about 2 to 3 weight percent and in the presence of divalent metal ions such as calcium and magnesium ions at concentrations of about 50 to 100 parts per million and above.

In view of the limitations thus imposed on the use of the petroleum sulfonate type surfactants, various amphoteric surfactants which are stable in high brine environments have been proposed for use in surfactant waterflooding. Thus, U.S. Pat. No. 3,939,911 to Maddox et al. discloses a surfactant waterflooding process in which a sulfonated betaine such as a $C_{12}$–$C_{24}$ alkyl amido $C_1$–$C_5$ alkyl dimethyl ammonium propyl sulfonate is employed in conjunction with an alkyl or alkylaryl sulfonate and a phosphate ester sulfonate. The multicomponent surfactant system disclosed in Maddox et al. is said to tolerate polyvalent ion concentrations from about 200 to about 14,000 parts per million.

Another surfactant waterflooding process employing certain amphoteric quaternary ammonium carboxylates is disclosed in U.S. Pat. No. 4,076,743 to Koch et al. The amphoteric surfactants employed in this process are the reaction products of certain amino or diamino alkanols quaternized with a monohalocarboxylic acid having from 1 to 5 carbon atoms. These amphoteric carboxylate surfactants are said to be effective in highly saline waters.

Yet a further surfactant waterflooding process employing amphoteric surfactants is disclosed in U.S. application Ser. No. 815,740, filed July 15, 1977, by Stamoulis Stournas. In this process, the amphoteric surfactants employed are certain hydrocarbyl quaternary ammonium sulfonates or carboxylates. These surfactants are effective in reducing oil-water interfacial tensions in the presence of highly saline brines and preferably are employed in low concentrations in a surfactant slug injected in a relatively large pore volume amount.

SUMMARY OF THE INVENTION

In accordance with the present invention, there is provided a new and improved waterflooding process in which at least a portion of the injected fluid is an aqueous liquid which is thickened by employing a surface-active quaternary ammonium sulfonate in admixture with a $C_5$–$C_8$ aliphatic alcohol. The amphoteric sulfonate surfactant is characterized by the formula:

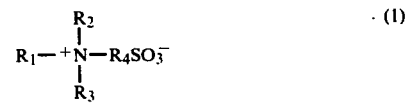

-continued

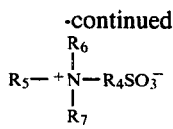

wherein:
- $R_1$ is a hydrocarbyl group containing from 8 to 26 carbon atoms,
- $R_2$ and $R_3$ are each independently a hydrocarbyl group containing from 1 to 8 carbon atoms or an alkoxy group containing from 2 to 10 carbon atoms and having a ratio of carbon atoms to oxygen atoms within the range of 2 to 3,
- $R_4$ is an aliphatic group containing from 1 to 6 carbon atoms, and
- $R_5$, $R_6$, and $R_7$ are aliphatic hydrocarbyl groups containing in combination a total number of carbon atoms within the range of 17 to 24 and at least two of $R_5$, $R_6$, and $R_7$ containing at least 8 carbon atoms.

The aliphatic alcohol is present in a concentration to provide a ratio of the volume amount of alcohol to the weight amount of surfactant within the range of 0.1–0.6. Preferably, the alcohol is a $C_6$–$C_8$ aliphatic alcohol and is employed in a concentration to provide an alcohol-surfactant ratio within the range of 0.1–0.4.

DESCRIPTION OF SPECIFIC EMBODIMENTS

Figure 1:
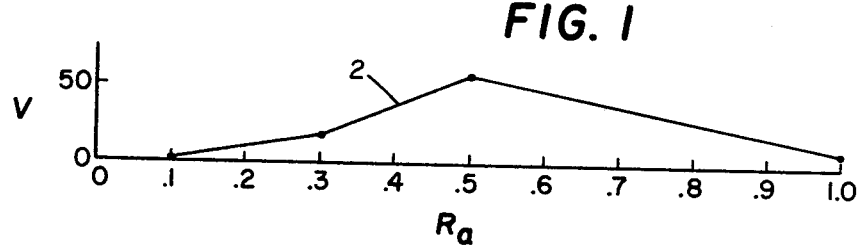
FIG. 1 is a graph illustrating the relationship between viscosity and relative concentrations of normal amyl alcohol and an amphoteric quaternary ammonium sulfonate.

The present invention involves a process for the recovery of oil employing a mixture of a $C_5$–$C_8$ aliphatic alcohol and quaternary ammonium sulfonate. The amphoteric sulfonates and aliphatic alcohols interact synergistically in aqueous solution to produce a pronounced thickening effect even in the presence of high salt concentrations.

Amphoteric quaternary ammonium sulfonates suitable for use in carrying out the present invention are disclosed in the aforementioned application Ser. No. 815,740 by Stournas. The lipophilic base of the surfactant is linked to the sulfonate group through the quaternary ammonium group and is provided by one or more hydrocarbyl groups. More specifically, the lipophilic base of the surfactant molecule may be provided by one or more aliphatic groups or aliphatic-substituted aryl groups. Where an aliphatic-substituted aryl group is employed in providing the lipophilic base, the aryl component may be a mononuclear group or a condensed ring dinuclear group, e.g. benzene or naphthalene, and contains one or more aliphatic substituents. Preferably, the aryl component is mononuclear in view of the practical considerations of economy and product synthesis and is substituted with a $C_8$–$C_{18}$ aliphatic group. Where the aryl component is dinuclear, it is substituted with a $C_6$–$C_{16}$ aliphatic group, thus providing a total of from 16 to 26 carbon atoms.

The lipophilic base of the amphoteric surfactant may be conjugated in nature as described hereinafter or it may be primarily monobasic. In the latter case, the lipophilic base may be provided by an aliphatic-substituted aryl group as described previously or by a $C_{10}$–$C_{20}$ aliphatic group. In the case of the conjugated derivative, the lipophilic base may be provided by two or three aliphatic groups containing in combination a total number of from 12 to 24 carbon atoms with at least one of the aliphatic groups containing 8 or more carbon atoms. The aliphatic groups or aliphatic substituents employed in formulating the lipophilic base may be unsaturated and/or can contain branched chains but usually will take the form of normal alkyl or alkynyl radicals.

The monobasic quaternary ammonium sulfonates employed in carrying out the invention may be characterized by the formula:

wherein:
- $R_1$ is a hydrocarbyl group containing from 8 to 26 carbon atoms,
- $R_2$ and $R_3$ are each independently a hydrocarbyl group containing from 1 to 8 carbon atoms or an alkoxy group containing from 2 to 10 carbon atoms and having a ratio of carbon atoms to oxygen atoms within the range of 2 to 3, and
- $R_4$ is an aliphatic group containing from 1 to 6 carbon atoms.

The number of carbon atoms in the group $R_1$ may vary as indicated by formula (1) between 8 to 26, depending upon the nature of the group and also the groups $R_2$ and $R_3$. Where $R_1$ is an aliphatic group, it will normally contain from 10 to 20 carbon atoms except in the case where $R_2$ and $R_3$ are each $C_8$ aliphatic groups, in which case $R_1$ may also be a $C_8$ aliphatic group. Where $R_1$ is an aliphatic-substituted aryl group, it normally will contain from 6 to 18 aliphatic carbon atoms and more specifically 8 to 18 aliphatic carbon atoms in the case of the mononuclear aryl derivative and 6 to 16 aliphatic carbon atoms in the case of the condensed ring dinuclear derivative.

The groups $R_2$ and $R_3$ may be the same or different and are selected from the group consisting of $C_1$–$C_8$ hydrocarbyl groups or $C_2$–$C_{10}$ alkoxy groups having a ratio of carbon atoms to oxygen atoms within the range of 2 to 3. Stated otherwise, where $R_2$ or $R_3$ is an alkoxy group, it may be ethylene oxide, polyethylene oxide containing up to 5 ethylene oxide units, propylene oxide, polypropylene oxide containing up to 3 propylene oxide units, or oligmers of mixtures of ethylene oxide and propylene oxide containing no more than 10 carbon atoms. The nature of the $R_2$ and $R_3$ groups are, as noted previously, somewhat dependent upon the nature of the $R_1$ group. Where $R_1$ comprises a relatively long chain aliphatic substituent, $R_2$ and $R_3$ normally will be relatively short chain hydrocarbyl groups or ethylene oxide derivatives. For example, where $R_1$ is a $C_{14}$–$C_{18}$ aliphatic radical, $R_2$ and $R_3$ normally will be methyl or ethyl groups or groups comprising ethylene oxide, propylene oxide, or polyethylene oxides. Where $R_1$ is a lower molecular weight group and thus imparts less oil solubility to the molecule, $R_3$ and/or $R_2$ may be somewhat more oil soluble to approach a molecular configuration in which the lipophilic base is conjugated in nature. The conjugated derivative employed in carrying out the invention may be characterized more specifically by the formula:

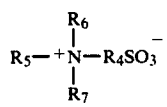

(2)

wherein:
$R_5$, $R_6$, and $R_7$ are aliphatic hydrocarbyl groups containing in combination a total number of carbon atoms within the range of 17 to 24 and at least two of $R_5$, $R_6$, and $R_7$ containing at least 8 carbon atoms, and
$R_4$ is as defined above with respect to formula (1).

In this case, at least two of the aliphatic groups are of sufficient chain length to impart oil solubility to the molecule. The remaining aliphatic group may be of short chain lengths such as in the case of a methyl or ethyl group or it may contain up to 8 carbon atoms and thus contribute to the lipophilic base. Examples of amphoteric surfactants having a conjugated lipophilic base which may be employed in carrying out the present invention include trioctylammonium propane sulfonate and bis(decyl)methylammonium propane sulfonate.

As understood by those skilled in the art, surfactant molecules are characterized by an oil-soluble portion of the molecule which tends to partition into the oil phase of an oil-water interface and a water-soluble portion which tends to partition into the water phase. In the amphoteric surfactants employed in the present invention, the sulfonate group is of course water soluble. In addition, the ammonium quaternary group tends to impart water solubility to the surfactant molecule to a degree depending upon the characteristics of the substituents, $R_2$ and $R_3$, described previously. The greatest water solubility is observed when the $R_2$ and $R_3$ are methyl or ethyl radicals or ethylene oxide derivatives and amphoteric surfactants of this molecular configuration are preferred in carrying out the invention.

The aliphatic linkage, $R_4$, between the quaternary ammonium and the sulfonate group contains 1 to 6 carbon atoms and, in the case of $R_4$ containing 2 or more carbon atoms, may be saturated or unsaturated and straight or branched chained. The $R_4$ radical may also be substituted with a group such as a hydroxy group which tends to increase the water solubility of this portion of the surfactant molecule. Usually, however, the $R_4$ group will be an unsubstituted hydrocarbyl radical. Preferably, $R_4$ is an aliphatic group containing from 1 to 4 carbon atoms. For a further description of the amphoteric quaternary ammonium sulfonates and their method of preparation and use in waterflooding, reference is made to the aforementioned application Ser. No. 815,740 by Stournas.

The aliphatic alcohol which is employed in combination with the surface-active amphoteric quaternary ammonium sulfonate contains from 5 to 8 carbon atoms. Thus, the alcohol cosolvent may be selected from the class consisting of amyl, hexyl, heptyl, and octyl alcohols. The alcohol may be straight or branched chained and may be a primary, secondary, or tertiary alcohol. As a practical matter, it usually will be desirable to employ normal primary alcohols. The alcohol is present in an amount relative to the amount of the amphoteric sulfonate surfactant to provide an increase in the viscosity of the aqueous solution, preferably to a value equal to or greater than the viscosity of the reservoir oil. The relative amounts of the amphoteric sulfonate and alcohol employed in formulating the thickened aqueous liquid are expressed herein in terms of the ratio, $R_a$, of the volume amount of alcohol to the weight amount of amphoteric sulfonate in accordance with the following relationship:

$$R_a = A/S$$

wherein:
A is the concentration of the alcohol in volume percent, and
S is the concentration of the surface-active amphoteric sulfonate in weight percent.

As explained with reference to the hereinafter described experimental data, the alcohol is employed in a concentration to provide a ratio, $R_a$, within the range of 0.1–0.6. The most pronounced thickening effect is observed for aliphatic alcohols containing from 6 to 8 carbon atoms and it is preferred to employ these alcohols in a concentration to provide a ratio, $R_a$, within the range of 0.1–0.4.

Experimental work relative to the present invention was carried out employing a number of aliphatic alcohols, each in combination with the same amphoteric quaternary ammonium sulfonate - cetyl dimethylammonium propane sulfonate. Viscosity measurements were obtained for mixtures of this amphoteric surfactant with alcohols ranging from propyl through octyl alcohols. The viscosity measurements were taken at several shear rates and are reported herein as calculated at a shear rate of 1.7 sec$^{-1}$. In some instances, interfacial tension measurements against a crude oil were also taken. The viscosity and interfacial tension measurements were tkaen at room temperature.

In one suite of experiments, viscosity measurements were taken for systems comprising mixtures of the abovedescribed amphoteric sulfonate and normal propyl and isopropyl alcohols and normal butyl and isobutyl alcohols. The surfactant-alcohol mixtures were dissolved in a high salinity mixed brine containing 13.2 weight percent sodium chloride, 2.6 weight percent calcium chloride, and 0.8 weight percent magnesium chloride to provide a total salinity of 16.6 weight percent (16.6 grams per deciliter). The results of this experimental work are set forth in Table I in which the first column designates the alcohol and the volume percent of alcohol used and the remaining columns the viscosity of the solutions in centipoises at 1.7 sec$^{-1}$ after one, five, twenty, and thirty days. In each solution, the surfactant was present in a concentration of 1.0 weight percent.

TABLE I

| Alcohol, % | | Viscosity, cp. | | | |
| --- | --- | --- | --- | --- | --- |
| | | 1 day | 5 days | 20 days | 30 days |
| n-propyl | 0.2 | | | 1.4 | |
| | .5 | | | 1.0 | |
| | .8 | | | 1.1 | |
| | 1.2 | | | 1.9 | |
| | 1.6 | | | 1.5 | |
| | 2.0 | | | 2.0 | |
| | 2.2 | 1.6 | | | 1.6 |
| | 2.4 | 1.5 | | | 1.7 |
| | 2.6 | 1.5 | | | 1.5 |
| | 2.8 | 1.5 | | | 1.7 |
| | 3.0 | 1.5 | | | 1.6 |
| isopropyl | .2 | | | 1.9 | |
| | .8 | | | 1.2 | |
| | 1.2 | | | 1.6 | |
| | 1.6 | | | 1.4 | |
| | 2.0 | | | 2.0 | |
| | 2.2 | 1.8 | 1.6 | | 1.6 |
| | 2.4 | 1.5 | 1.6 | | 1.6 |
| | 2.6 | | 1.6 | | 1.5 |
| | 2.8 | | 1.5 | | 1.5 |
| | 3.0 | | 1.5 | | 1.5 |
| n-butyl | .1 | | | 1.5 | |
| | .3 | | | 1.6 | |
| | .5 | 1.7 | | 2.0 | |
| | .7 | 3.4 | | 3.0 | |
| | .8 | 2.8 | | 3.4 | |
| | 1.0 | 2.9 | | 3.7 | |
| | 1.5 | | | 3.9 | |
| | 2.0 | | | 2.9 | |
| isobutyl | .5 | | | 2.0 | |
| | .7 | 2.4 | | 2.3 | |
| | 1.0 | 3.1 | | 3.5 | |
| | 1.2 | 4.1 | | 4.3 | |
| | 1.4 | 2.9 | | 3.9 | |

As can be seen from an examination of the data presented in Table I, the use of $C_3$ and $C_4$ alcohols produced only a very modest thickening effect even at a surfactant concentration of 1 weight percent. While both the iso- and normal $C_3$-$C_4$ alcohols behaved similarly, only a slight increase in viscosity was observed upon the addition of these alcohols.

Table II sets forth the results of experimental work carried out employing aliphatic alcohols containing from 5 to 8 carbon atoms. In each case, the surfactant solution employed was cetyl dimethylammonium propane sulfonate dissolved in the 16.6 percent brine described previously. In Table II, the first column sets forth the concentration of the amphoteric sulfonate in weight percent and the second column sets forth the designation of the alcohol and the alcohol concentration in volume percent. The third and fourth columns set forth the viscosity of the solutions in centipoises at 1.7 sec$^{-1}$ at 5 and 20 days after formulation of the solution, respectively. The last column sets forth the interfacial tensions in millidynes per centimeter of the solutions against a crude oil after aging for 40 days.

TABLE II

| Sulfonate Conc., % | Alcohol | % | Viscosity, cp. | | Interfacial Tension |
| --- | --- | --- | --- | --- | --- |
| | | | 5 days | 20 days | |
| 0.5 | n-amyl | 0.05 | | 1.06 | |
| | | .1 | | 2.44 | |
| | | .15 | 1.79 | | |
| | | .20 | 4.95 | | 276.4 |
| | | .3 | | 7.79 | |
| | | .5 | | 6.71 | |
| | | 1.0 | | 3.94 | |
| 1.0 | | .1 | | 1.63 | 356 |
| | | .3 | 11.3 | 17.21 | 379 |
| | | .4 | 36.2 | | 206 |
| | | .5 | 44.3 | 57.84 | 138 |
| | | .6 | 25.0 | | 100.9 |
| | | .75 | 10.1 | | 27.3 |
| | | 1.0 | | 9.29 | 65 |
| | | 1.5 | | 2.02 | |
| 0.5 | n-hexyl | 0.05 | | 1.61 | 366 |
| | | 0.1 | 6.94 | 6.95 | 206 |
| | | .15 | | 78.6 | 149.4 |
| | | .18 | 23.2 | | 172.6 |
| | | .2 | | 39.0 | 107 |
| | | .25 | | 1.79 | 126.5 |
| | | .3 | | 1.89 | 47 |
| | | .5 | | 2.12 | |
| 1.0 | | .1 | | 3.65 | 279 |
| | | .15 | | 50.8 | 188.2 |
| | | .2 | | 151 | 149.1 |
| | | .25 | | 323 | 157.8 |
| | | .3 | 141.9 | 174 | 74 |
| | | .5 | | 3.1 | 39 |
| | | 1.0 | | 7.4 | |
| 0.5 | n-heptyl | .01 | | 1.6 | 257.9 |
| | | .03 | | 1.6 | 216.3 |
| | | .05 | 64.1 | 41.9 | 183 |
| | | .075 | 144.5 | | |
| | | .1 | 32.3 | 41.7 | 92 |
| | | .3 | | 1.85 | 24 |
| | | .5 | | 1.03 | 24 |
| 1.0 | | .05 | | 2.6 | 306 |
| | | .1 | 14.9 | 12.9 | 65 |
| | | .15 | | 287 | 227.3 |
| | | .2 | | 224 | 133.2 |
| | | .25 | | 108 | 91.9 |
| | | .3 | 11.4 | 15.7 | 9 |
| | | .5 | | 2.0 | |
| | | 1.0 | | 0.9 | |
| 0.5 | n-octyl | .01 | | 1.5 | 273.7 |
| | | .03 | | 1.6 | 2519. |
| | | 0.5 | 29.8 | 25.3 | |
| | | 0.75 | 26.9 | | |
| | | .1 | 24.7 | 29.1 | |
| | | .3 | | 1.3 | |
| | | .5 | | 1.5 | |
| 1.0 | | 0.5 | | 3.5 | |
| | | .1 | 15.7 | 15.0 | 206 |
| | | .15 | | 170 | 174.3 |
| | | .2 | | 50 | 182. |
| | | .25 | | 25 | 1166. |
| | | .3 | 22.2 | 18.8 | 99 |
| | | .5 | | 1.8 | |

As can be seen from the data presented in Table II, each of the alcohols shown produced a significant increase in viscosity with the most pronounced increases produced by the $C_6$ through $C_8$ alcohols. The hexyl and heptyl alcohols resulted in the highest viscosities with the octyl alcohol producing a less pronounced but still significantly greater effect than that achieved through the use of the amyl alcohol. It will be recognized that the thickening effect varies directly with the concentration of the amphoteric sulfonate and is also dependent upon the alcohol concentration. In each instance as the amount of alcohol in the system is progressively increased, the viscosity increases to a maximum value and thereafter declines.

Figure 2:
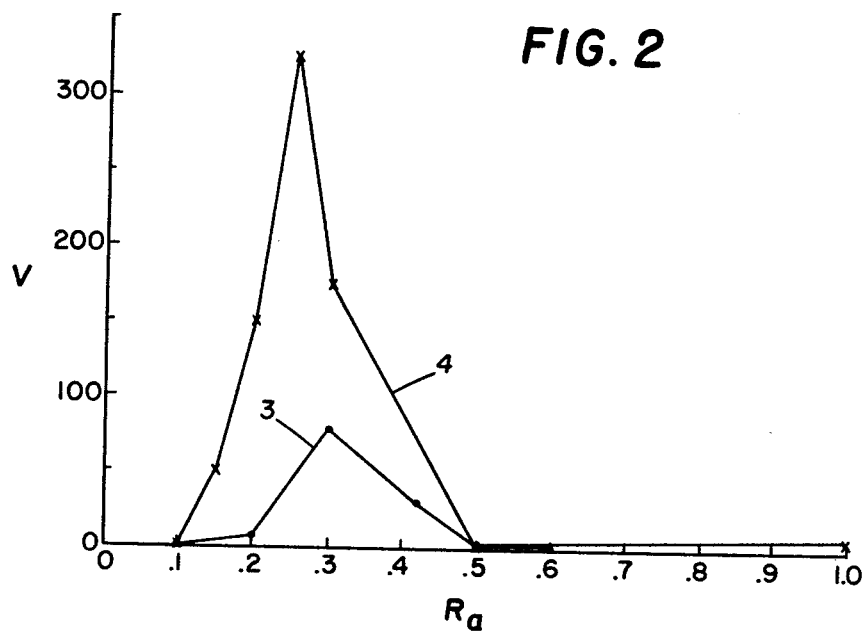
FIG. 2 is a graph illustrating the relatonship between viscosity and relative concentrations of normal hexanol and an amphoteric quaternary ammonium sulfonate.
Figure 3:
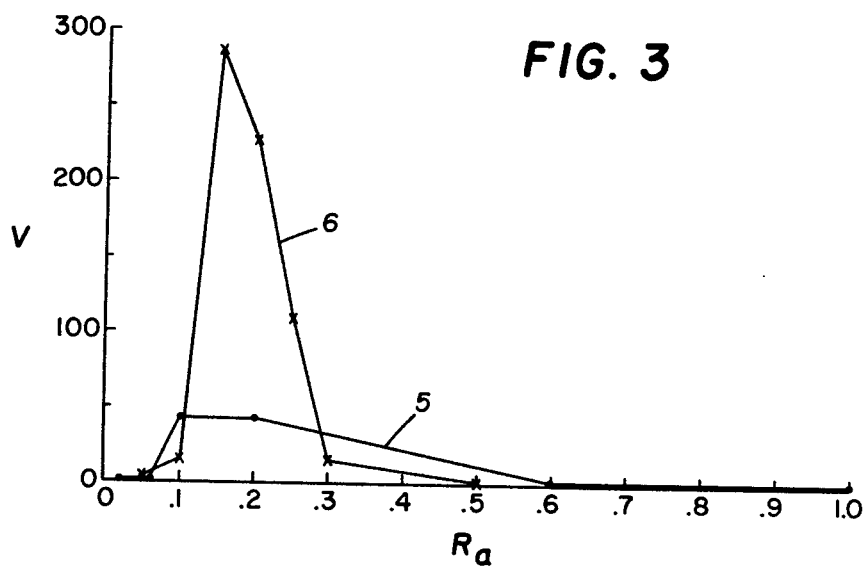
FIG. 3 is a graph illustrating the relationship between viscosity and relative concentrations of normal heptanol and an amphoteric quaternary ammonium sulfonate.
Figure 4:
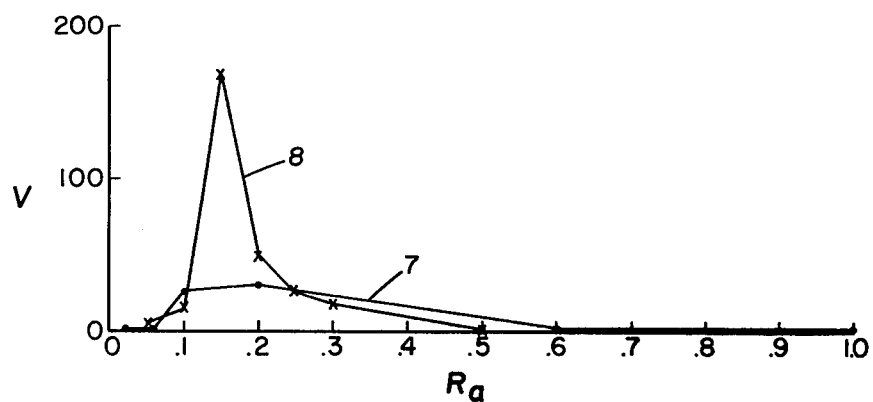
FIG. 4 is a graph illustrating the relationship between viscosity and relative concentrations of normal octanol and an amphoteric quaternary ammonium sulfonate.

Turning now to the drawings, certain of the data set forth in Table II are presented in FIGS. 1 through 4 in which the curves shown are graphs of the viscosity, V, in centipoises on the ordinate versus the previously described alcohol-surfactant ratio, $R_a$, on the abscissa. In each case, the viscosity measurements as taken at 20 days and set forth in column four of Table II are shown by the graphs. Curve 2 of FIG. 1 illustrates the viscosities observed for the system containing amyl alcohol and 1.0 weight percent amphoteric sulfonate. In FIG. 2, curves 3 and 4 depict the hexanol systems containing 0.5 and 1.0 weight percent, respectively, of the amphoteric sulfonate. FIGS. 3 and 4 present the data for the heptanol and octanol systems, respectively. Curves 5 and 6 of FIG. 3 and curves 7 and 8 of FIG. 4 correspond to the systems containing 0.5 and 1.0 weight percent of the amphoteric sulfonate, respectively.

An examination of the graphs presented in FIGS. 1 through 4 shows the effect of the alcohol-surfactant ratio, $R_a$, on the viscosity yield of the multicomponent system. For the moderately effective amyl alcohol systems, the thickening effect begins to appear at a ratio, $R_a$, at about 0.3 and appears to extend over a relatively broad range. For the more effective $C_6$–$C_8$ alcohols, satisfactory viscosity yields are found to occur at values of $R_a$ within the range of 0.1–0.4. For the $C_6$ alcohol systems, the most pronounced viscosity yields are found at values of $R_a$ within the range of 0.2–0.4 and for the $C_7$ and $C_8$ alcohols within the range of 0.1–0.3.

The thickened aqueous solutions of alcohol and amphoteric quaternary ammonium sulfonate tend to lose their viscosity upon the addition of crude oil or other hydrocarbon materials. Thus, an aqueous solution of 0.5 percent cetyl quaternary ammonium sulfonate and 0.1 volume percent octyl alcohol exhibited a viscosity after aging for 20 days of 29 centipoises as indicated in Table II. Upon the addition of 1 volume percent crude oil, the viscosity decreased to a value of 1.5 centipoises after 2 hours. Similar relationships are shown for the other surfactant-alcohol systems tested. Thus, a solution of 0.05 volume percent of heptanol and 0.5 weight percent surfactant went from an initial viscosity of 42 centipoises to a viscosity of 1.5 centipoises upon the addition of 1 volume percent crude oil.

Figure 5:
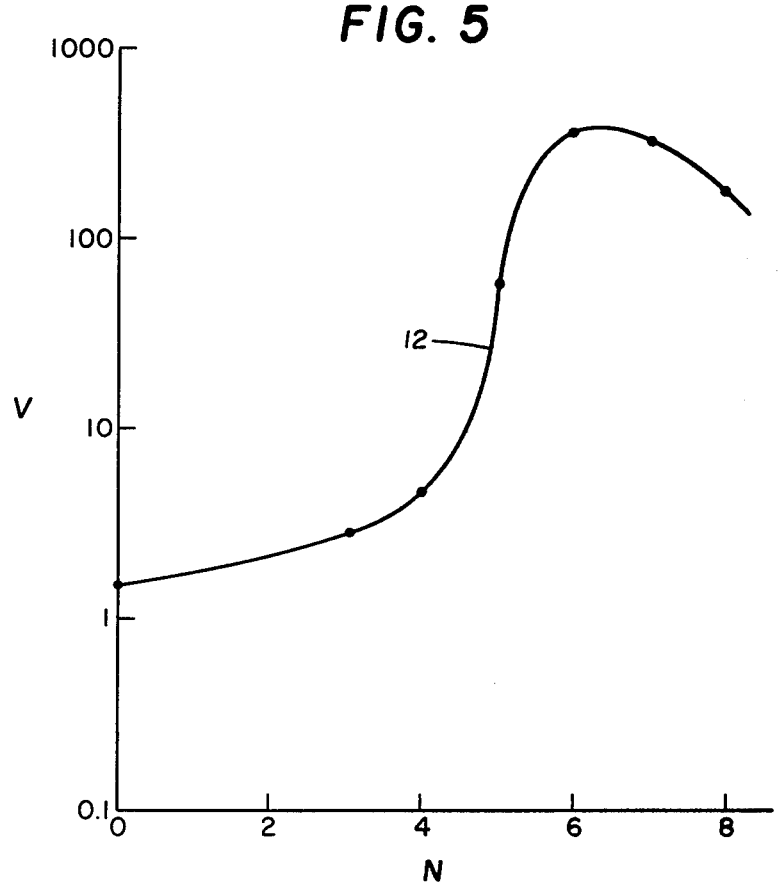
FIG. 5 is a graph illustrating the maximum viscosity observed for various solutions of an amphoteric quaternary ammonium sulfonate and normal- or iso-alkanols as a function of the number of carbon atoms in the alcohols.

The significance of the number of carbon atoms in the alcohol cosolvent is illustrated graphically by FIG. 5 in which curve 12 is a plot of the log of the maximum viscosity, $V_m$, in centipoises on the ordinate versus the number, N, of carbon atoms in the alcohol on the abscissa. As can be seen from an examination of curve 12, the maximum viscosity measured increases dramatically when going from butyl alcohol to amyl alcohol systems and then exhibits a further significant increase when going from amyl to hexyl alcohol systems. Thereafter, the maximum viscosity exhibits progressively greater decreases in viscosity as the alcohol carbon number is increased from 6 through to 8.

The amphoteric sulfonate may be employed in any suitable concentration depending upon the alcohol used, the alcohol-surfactant ratio, $R_a$, and the desired viscosity of the mobility control slug, which usually will be equal to or greater than the viscosity of the reservoir oil. In most cases, the amphoteric sulfonate will be present in a concentration of at least 0.1 weight percent.

As indicated by the data previously reported in Table II, the addition of the alcohol cosolvent to the amphoteric sulfonate solution results in a reduction of the oil-water interfacial tension with the lowest interfacial tensions normally occurring at alcohol-surfactant ratios, $R_a$, above the values at which maximum viscosity yields are observed. While significant reductions in oil-water interfacial tension are achieved, they tend to be somewhat transitory and in addition are usually above the level normally associated with optimum microscopic oil displacement. In addition, it will be recalled that the viscous surfactant-alcohol solutions tend to lose their viscosity as they take up crude oil from the formation. Under these circumstances it is preferred to precede the thickened aqueous alcohol-surfactant solution with an aqueous solution of a surfactant selected to provide the desired low oil-water interfacial tension, e.g. on the order of 10 millidynes/centimeter or less, normally associated with optimum microscopic oil displacement. Thereafter, the thickened aqueous solution of alcohol and amphoteric quaternary ammonium sulfonate is injected for mobility control purposes.

The characteristic decrease in viscosity upon contact of the thickened aqueous solution with oil results in preferential flow through those portions of the formation which contain a significant residual oil saturation after passage of the surfactant slug. For example, considering a vertical profile of the reservoir, the alcohol-surfactant solution will undergo a decrease in viscosity upon contacting an interval of the formation containing residual oil. In formation intervals which are free of oil, the alcohol-surfactant solution will retain its viscosity. Thus, the higher mobility of the fluid in the oil-containing section will tend to cause preferential flow through this section with attendant additional displacement of oil therefrom.

In a further embodiment of the invention, this characteristic is used to advantage by following the viscous alcohol-surfactant solution with an aqueous surfactant slug. This slug may be employed as the sole surfactant slug or may be employed in conjunction with a surfactant slug injected ahead of the alcohol-surfactant solution. The surfactant employed in formulating the surfactant slug may be any suitable surfactant which is effective in reducing the interfacial tension between the injected aqueous liquid and the reservoir oil. Various surfactant formulations, either amphoteric, anionic, or nonionic, have heretofore been proposed for use in surfactant waterflooding procedures and may be employed in the present invention. These include anionic compounds such as petroleum sulfonates and synthetic alkylaryl sulfonates or, where high brine environments are involved, ether-linked sulfonates such as disclosed in U.S. Pat. No. 3,827,497 to Dycus et al. and U.S. Pat. No. 3,977,471 to Gale et al. Suitable nonionic surfactants include polyethoxylated alkyl phenols and polyethoxylated aliphatic alcohols.

The thickened aqueous solution of alcohol and amphoteric sulfonate may be injected in any suitable amount as necessary for effective mobility control. Normally, the alcohol-surfactant solution will be injected in an amount within the range of 0.1–0.5 pore volumes. The surfactant slug or slugs injected before or after the alcohol-surfactant mobility control slug normally will be injected in amounts of 0.1 pre volume or more but may range down to 0.02 pore volume. Where an amphoteric surfactant such as disclosed in the aforementioned application Ser. No. 815,740 is employed, it usually will be desirable to inject a relatively large amount, e.g. 0.5 pore volume or more, and employ the surfactant at a relatively low concentration in order to arrive at an optimum low oil-water interfacial tension. Subsequent to the injection of the mobility control slug and surfactant slug or slugs, a driving fluid is injected in order to displace the previously injected fluids through the formation. The driving fluid may be any water which is locally available and is not incompatible with the formation and is injected in such amount as necessary to carry the process to its conclusion.

Since the surfactant-alcohol solutions employed in the present invention retain high viscosities in the presence of high concentrations of dissolved salts, they are particularly useful in situations where the reservoir water or the available flooding medium exhibit salinities inconsistent with the thickened surfactant slugs such as disclosed in the aforementioned patent and application by Savins et al. Accordingly, a preferred application of the present invention is in those situations in which the reservoir waters and/or the waters employed in formulating the flooding medium exhibit a salinity of 4.0 weight percent or more. By the term "salinity" as used herein is meant the dissolved salt content of the aqueous medium whether provided by monovalent salts such as sodium chloride or divalent salts such as magnesium and calcium chlorides or mixtures thereof.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used herein is meant that volume of the portion of the formation underlying the well pattern employed, as described in greater detail in the Burdyn et al. patent.

We claim:

1. In a method for the recovery of oil from a subterranean oil reservoir penetrated by spaced injection and production systems wherein an aqueous fluid is introduced into the reservoir via said injection system to displace oil to said production system, the improvement comprising employing as at least a portion of the fluid introduced into said injection system an aqueous liquid which is thickened by the addition of a $C_5$–$C_8$ alkanol and a surface-active amphoteric sulfonate characterized by the formula:

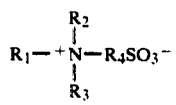

or

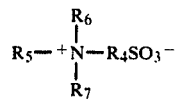

wherein:
$R_1$ is a hydrocarbyl group containing from 8 to 26 carbon atoms,
$R_2$ and $R_3$ are each independently a hydrocarbyl group containing from 1 to 8 carbon atoms or an alkoxy group containing from 2 to 10 carbon atoms and having a ratio of carbon atoms to oxygen atoms within the range of 2 to 3,
$R_4$ is an aliphatic group containing from 1 to 6 carbon atoms, and
$R_5$, $R_6$, and $R_7$ are aliphatic hydrocarbyl groups containing in combination a total number of carbon atoms within the range of 17 to 24 and at least two of $R_5$, $R_6$, and $R_7$ containing at least 8 carbon atoms,
said alkanol being present in a concentration to provide a ratio, $R_a$, of the volume amount of alkanol to the weight amount of amphoteric sulfonate within the range of 0.1–0.6.

2. The method of claim 1 wherein said thickened aqueous liquid has a salinity of at least 4.0 weight percent.

3. The method of claim 1 wherein said alkanol contains from 6 to 8 carbon atoms and is present in a concentration to provide an alkanol-surfactant ratio, $R_a$, within the range of 0.1–0.4.

4. The method of claim 1 wherein said alkanol contains 6 carbon atoms and is present in a concentration to provide an alkanol-surfactant ratio, $R_a$, within the range of 0.2–0.4.

5. The method of claim 1 wherein said alkanol contains from 7 to 8 carbon atoms and is present in a concentration to provide an alkanol-surfactant ratio, $R_a$, within the range of 0.1–0.3.

6. The method of claim 1 further comprising the step of injecting an aqueous surfactant slug into said injection system subsequent to the injection of said thickened aqueous liquid.

* * * * *